United States Patent
Sims et al.

[11] Patent Number: 6,042,050
[45] Date of Patent: Mar. 28, 2000

[54] SYNTHETIC DISCRIMINANT FUNCTION AUTOMATIC TARGET RECOGNITION SYSTEM AUGMENTED BY LADAR

[75] Inventors: S. Richard F. Sims; William C. Pittman, both of Huntsville, Ala.

[73] Assignee: The United States of America as represented by the Secretary of the Army, Washington, D.C.

[21] Appl. No.: 09/250,914

[22] Filed: Feb. 16, 1999

[51] Int. Cl.[7] .............................. F42B 15/01; F41G 7/00
[52] U.S. Cl. ................ 244/3.17; 244/3.15; 244/3.16; 342/52; 342/53; 342/54; 342/61; 342/62; 342/89; 342/90; 382/103
[58] Field of Search ................ 244/3.13, 3.15, 244/3.16, 3.17, 3.19; 342/25, 52–55, 61–63, 66, 67, 68, 64, 89, 90; 382/103, 209, 210; 348/81; 356/4.01

[56] References Cited

U.S. PATENT DOCUMENTS

| | | | |
|---|---|---|---|
| 3,779,492 | 12/1973 | Grumet | 244/3.17 |
| 4,490,849 | 12/1984 | Grumet et al. | 382/210 |
| 5,233,541 | 8/1993 | Corwin et al. | 348/81 |
| 5,341,142 | 8/1994 | Reis et al. | 342/64 |
| 5,524,845 | 6/1996 | Sims et al. | 244/3.17 |
| 5,561,431 | 10/1996 | Peele et al. | 342/90 |
| 5,644,386 | 7/1997 | Jenkins et al. | 356/4.01 |
| 5,867,118 | 2/1999 | McCoy et al. | 342/90 |
| 5,937,078 | 8/1999 | Hyland et al. | 382/103 |
| 5,947,413 | 9/1999 | Mahalanobis | 244/3.17 |

OTHER PUBLICATIONS

"Target signature consistency of image data fusion alternatives" by S. Richard F. Sims and Margaret A. Phillips, *Society of Photo–Optical Instrumentation Engineers*, pp. 743–754 (1997).

*Primary Examiner*—Bernarr E. Gregory
*Attorney, Agent, or Firm*—Arthur H. Tischer; Hay Kyung Chang

[57] ABSTRACT

Synthetic discriminant function automatic target recognition system augmented by LADAR combines, through the synthetic discriminant function (SDF), the active LADAR data of the potential target object with the passive infrared imagery of the target and background. In doing so, the system not only recognizes and classifies the target but also provides the range profile of the target object by analyzing the amplitude of the reflected return signal when appropriate. The live target scene imagery in passive infrared is detected, filtered and subsequently complex multiplied with pre-existing synthetic discriminant function to produce a two-dimensional cross-correlated surface. Analogous process is performed on the active LADAR range and intensity images of the live target scene with corresponding pre-existing synthetic discriminant function for the same target pose and scale as in the passive infrared correlation step. Ultimately, the target information thus acquired in passive infrared and active LADAR is fused to obtain a more accurate determination of the target location and classification than is possible using either infrared or LADAR alone.

5 Claims, 3 Drawing Sheets

SYNTHETIC DISCRIMINANT FUNCTION AUTOMATIC TARGET RECOGNITION SYSTEM AUGMENTED BY LADAR

DEDICATORY CLAUSE

The invention described herein may be manufactured, used and licensed by or for the Government for governmental purposes without the payment to us of any royalties thereon.

BACKGROUND OF THE INVENTION

The synthetic discriminant function (SDF) has evolved over many years from the first purely linear encoding to the first practically usable minimum average correlation energy (MACE). It is based on the idea of using a linear or nonlinear combination of reference images of an object to create a composite image filter of the object. The composite filter can be thought of as a type of combination of the target object reference images from multiple positions and scales. The resulting encoding, regardless of the specific encoding method used, produces the SDF filter, a complex-valued two dimensional filter which can be as large as the input image size.

LADAR (laser detection and ranging) works on the same principle as microwave RADAR in which either pulsed or continuous wave electromagnetic radiation is emitted toward and reflected from a potential target object. The reflected signal is received and analyzed to determine the distance between the LADAR and the reflecting objects. The short wavelength of the laser allows the beam to be concentrated in a very narrow field of view. The short wavelength also enables a high range resolution that allows the detailed structure of the target to be examined in depth. Imaging LADAR receivers are very similar to RADAR receivers in their use of ranged gating technology in pulsed systems or phase difference detection in continuous wave receivers. The LADAR reveals four properties of the reflected signal that can be used to differentiate man-made targets from the natural background. First, range data can be used to examine the surface geometry of the target object, including vibration effects; second, intensity data provides information about the nature of the surface material; third and fourth, polarimetric and velocity data, respectively, allow the man-made objects to be distinguished from the background.

SUMMARY OF THE INVENTION

Synthetic discriminant function automatic target recognition system augmented by LADAR 100 (hereinafter referred to as "the system") combines, through the synthetic discriminant function (SDF), the active LADAR data of the potential target object with the passive infrared imagery of the target and background. In doing so, the system not only recognizes and classifies the target but also provides the range profile of the target object by analyzing the amplitude of the reflected return signal when appropriate.

The live target scene imagery in passive infrared is detected and filtered and subsequently complex multiplied with pre-existing synthetic discriminant function to produce a two-dimensional cross-correlated surface. This process is described by S. Richard F. Sims et al in U.S. Pat. No. 5,524,845 (Jun. 11, 1996) the teaching of which in its entirety is incorporated hereinto. With each element of the synthetic discriminant function in infrared that is stored in SDF memory module 113, a corresponding range (i.e. temperature information from the infrared image data) profile is also stored in the SDF memory module. Analogous process is performed on the active LADAR range and intensity images of the live target scene with corresponding pre-existing synthetic discriminant function for the same target pose and scale as in the passive infrared correlation step. Ultimately, the target information thus acquired in passive infrared and active LADAR is fused to obtain a more accurate determination of the target location and classification than is possible using either infrared or LADAR alone.

DESCRIPTION OF THE PREFERRED EMBODIMENT

Figure 1:
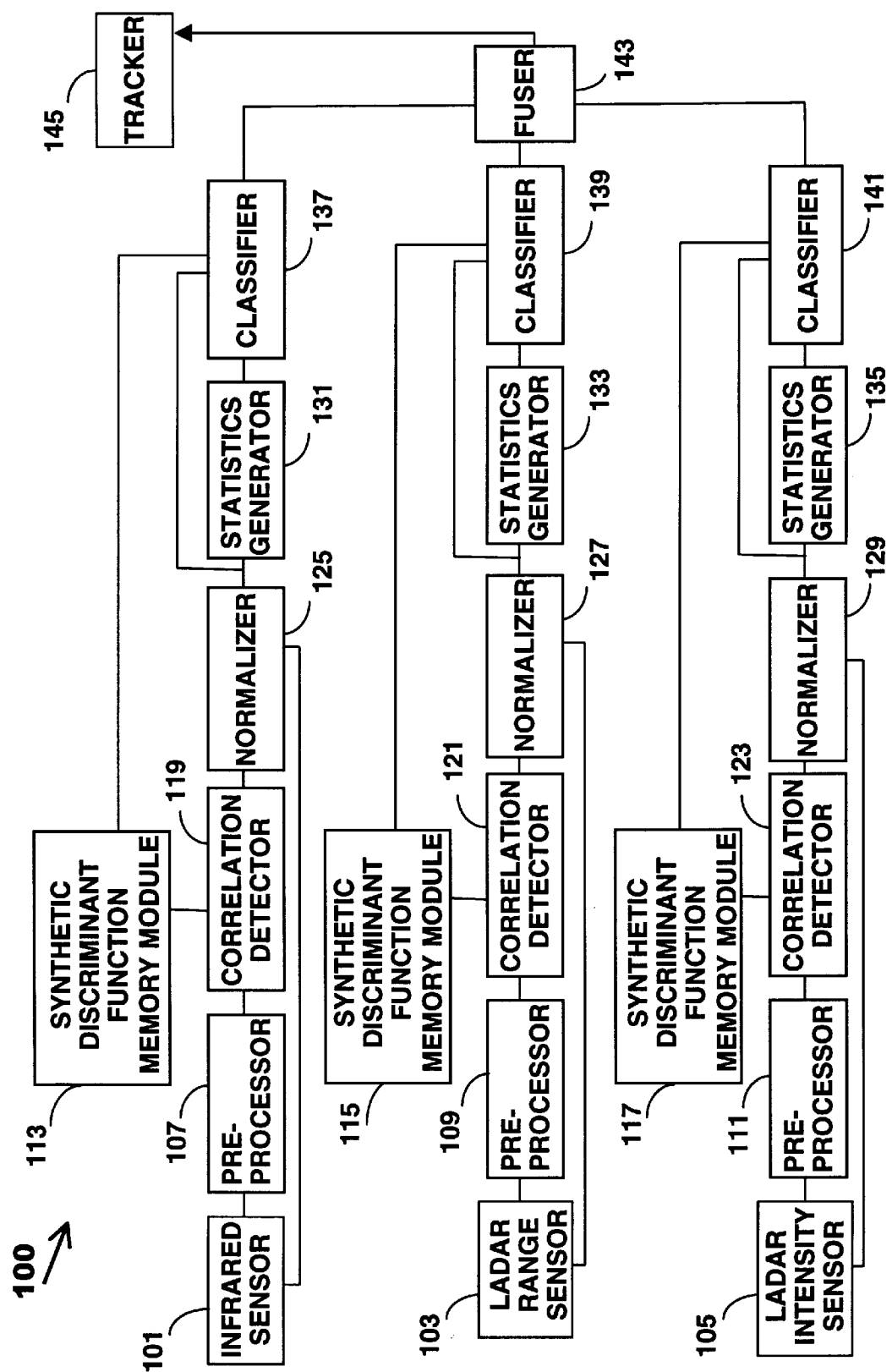
FIG. 1 shows an embodiment of the synthetic discriminant function automatic target recognition system augmented by LADAR wherein fusion of the target imagery data from multiple sensors occurs after classification of the target.

In order to facilitate the description of the invention, herein is presented a brief explanation of the prior art of making synthetic discriminant function filters that are installed in SDF memory modules 113, 115 and 117 before the commencement of the operation of the synthetic discriminant function automatic target recognition system augmented by multiple channels as shown in FIG. 1.

Typical steps in conventional automatic target recognition are detection, segmentation (i.e. separating the target from the background) and classification. However, target recognition using the synthetic discriminant function involves only two steps, those of detection and classification since segmentation is imbedded in the overall process. The SDF filter preparation involves the acquisition by sensors, such as passive infrared sensor 101 in FIG. 1, of digitized imagery of a target object in a real world scene such as a tank at several different poses. For example, one left and one right broadside view may be required as well as a front and rear view all at the same elevation angle. Several poses off the broadside views at, say, + or −15 degrees may be taken and combined with the broadside view to make a single SDF filter. If the target object is symmetrical in shape, then it may be possible to eliminate one of the broadside views. SDF filters are needed not only for different azimuth and elevation angles from the target but also at different ranges as well. The selection of particular geometric parameters such as the range or angle increments to be used in formulating a set of filters for a given target object is not a precise science. Once the sensor detects a potential target object, a rectangular window is placed around the target, the window perimeter touching the outermost edges of the target. Although the target fills most of the field of view inside the window, some background also is inside the window. A mean is computed for both the scene outside the window as well as inside and this mean replaces the real-world scene outside the window and allows the smooth merging of the scene outside and inside the window without disturbing discontinuities. A weighted window is also sometimes applied. A target aimpoint is designated on the target and this aimpoint is placed at the center of a reference array of pixels representing the specific sensor that is selected for use. This, in turn, allows the computation of the gray level for each pixel of the filter currently being made. The computed gray level is merged with that of other filters that describe the same target object (example: a tank) to produce a composite synthetic discriminant function filter for that particular target object. The synthetic discriminant function automatic target recognition system augmented by LADAR 100 processes not only the passive infrared images but the range and intensity images of the target acquired by the LADAR. Therefore, the process of fabricating the reference SDF filters must be repeated as explained above for each imagery type used. In other words, composite SDF filters of various targets that are likely to be found in a battlefield are made using LADAR range imagery data and installed in LADAR range SDF memory module 115 and composite SDF filters made using LADAR intensity imagery data are installed in LADAR intensity SDF memory module 117.

In the embodiment depicted in FIG. 1, the three imagery data types (passive infrared, active LADAR range and active LADAR intensity) detected by infrared sensor 101, LADAR range sensor 103 and LADAR intensity sensor 105, respectively, are processed in a separate channel, independently of each other, by infrared classifier 137, LADAR range classifier 139 and LADAR intensity classifier 141, respectively, through the classification stage. Subsequently, the fusion of the three different data types occurs in fuser 143 to yield a greater reliability in both the detection and classification of a potential target than by using only one image data type. For the operation of each channel depicted in the figure, a reference synthetic discriminant function filter of the target object corresponding to the particular imagery data type sensed for that channel is required to be pre-fabricated and installed in its corresponding synthetic discriminant function memory module. Any set of three reference SDF filters that are used simultaneously in the three channels is made for the same target pose angle; however each channel is optimized and its threshold is set independently of the others.

Even though the following description of the embodiment of FIG. 1 from the sensing of the digitized data through the classification of the target is addressed to the processing of passive infrared image data, analogous descriptions apply to the processing of the LADAR range and LADAR intensity data occuring simultaneously with the processing of the infrared image data.

Infrared sensor 101 detects a scene with a potential live target and sends digitized infrared image data of the scene to pre-processor 107 which eliminates any dc component from the data and performs convolution on the image and produces an image filter of the live target. The filtered image data is then input to correlation detector 119 which performs correlation of the live image filter with a reference SDF filter that is input from SDF filter module 113, the reference SDF filter having been previously made for the same pose angle of the target under consideration. The correlation operation produces a correlation surface which is, then, input to normalizer 125. While the correlation surface is being produced, global statistics (i.e. the mean and standard deviation) are created internally in correlation detector 119. Image correlation is an integration in two dimensions that leads to the production of a large result for a large input. This is clearly not the result desired from a "pattern matching" or a cross-correlation method in general. Therefore the correlation surface is post-processed to remove the "input energy". This post-processing is the normalization which computes the local area statistics and is performed on a local area based on the target size with the live input image data from sensor 101. Each local area of the target has the local mean removed and the result is scaled by the local standard deviation. This is performed for every target size region in the correlation. The regions of the normalized correlation surface that exceed a pre-selected peak-to-side lobe ratio are "detection areas" which are input to correlation classifier 137 as well as to statistics generator 131. The statistics generator computes the mean and standard deviation of the entire correlation surface and inputs this information to correlation classifier 137. During the classification stage, the detection areas are extracted from the input image for classification of each object. The statistics from statistics generator 131, the normalized correlation surface from normalizer 125 and the reference SDF filter from SDF memory module 113 are inputs to the classification process. The reference SDF filter used for classification is a smaller version of the reference SDF filter used for the correlation detection. During the classification process, distance measures using the now-well-known distance classifier correlation filters (DCCF) are used by the classifier to compute the distance to each class. If the distance to the detection class is not the smallest, there is ambiguity and not enough information to determine the correct class, thereby producing an "unknown" label for that object. If the distance to the detection class is the smallest for all classes, then a distance ratio is computed to the next closest class. An empirical confidence threshold is then used to determine if the desired level of confidence has been reached based on the distance ratio. If the distance ratio is smaller than the confidence threshold, the target object is classed based on its detection class. If the distance ratio is larger than the confidence threshold, then the uncertainty is too high, thereby again producing "unknown" for that detected object. There are several ways to create the coordinate for the distance measure extraction based on the DCCF cross correlation. The coordinate based on the normalized correlation surface, the highest value from the DCCF correlation or the value at the detection coordinate from the original detection correlation may be used. Finally, the correlated target images from infrared correlation classifier 137, LADAR range correlation classifier 139 and LADAR intensity correlation classifier 141 are input to fuser 143. There, the three correlated target images are fused with experimentally determined weights to conclude the target location and classification with greater reliability than such a conclusion drawn from one correlated target image. Thereafter, the target location and classification as determined is transmitted to tracker 145 for a more accurate tracking of and ultimate impact on the target. The fusion method used by fuser 143 depends on the encoding techniques that were used to create the reference SDF filters.

Figure 2:
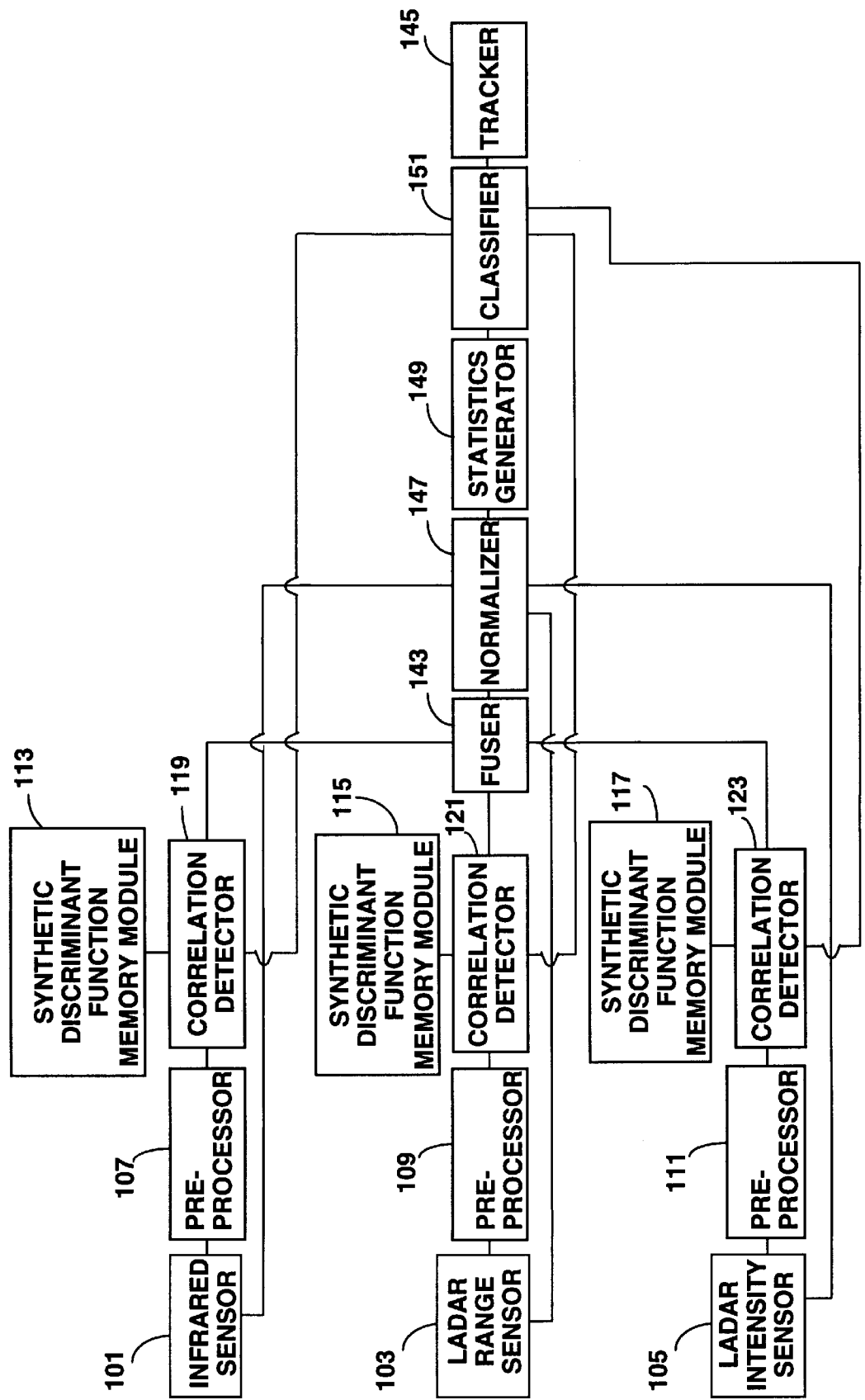
FIG. 2 shows another embodiment of the synthetic discriminant function automatic target recognition system augmented by LADAR wherein the fusion of the data from the sensors occurs after correlation of the live imagery with the synthetic discriminant function.

The embodiment presented in FIG. 2 differs from that in FIG. 1 in that fusion of data occurs after correlation detection of the potential target by infrared correlation detector 119, LADAR range correlation detector 121 and LADAR intensity correlation detector 123. After the fusion, normalization, statistics generation and correlation classification occur as described above for FIG. 1 using the same or equivalent devices. It is noted that one LADAR sensor may detect the range and intensity of the reflected laser pulses returning from the potential target and input the appropriate data to range pre-processor 109 and intensity pre-processor 111, respectively.

Figure 3:
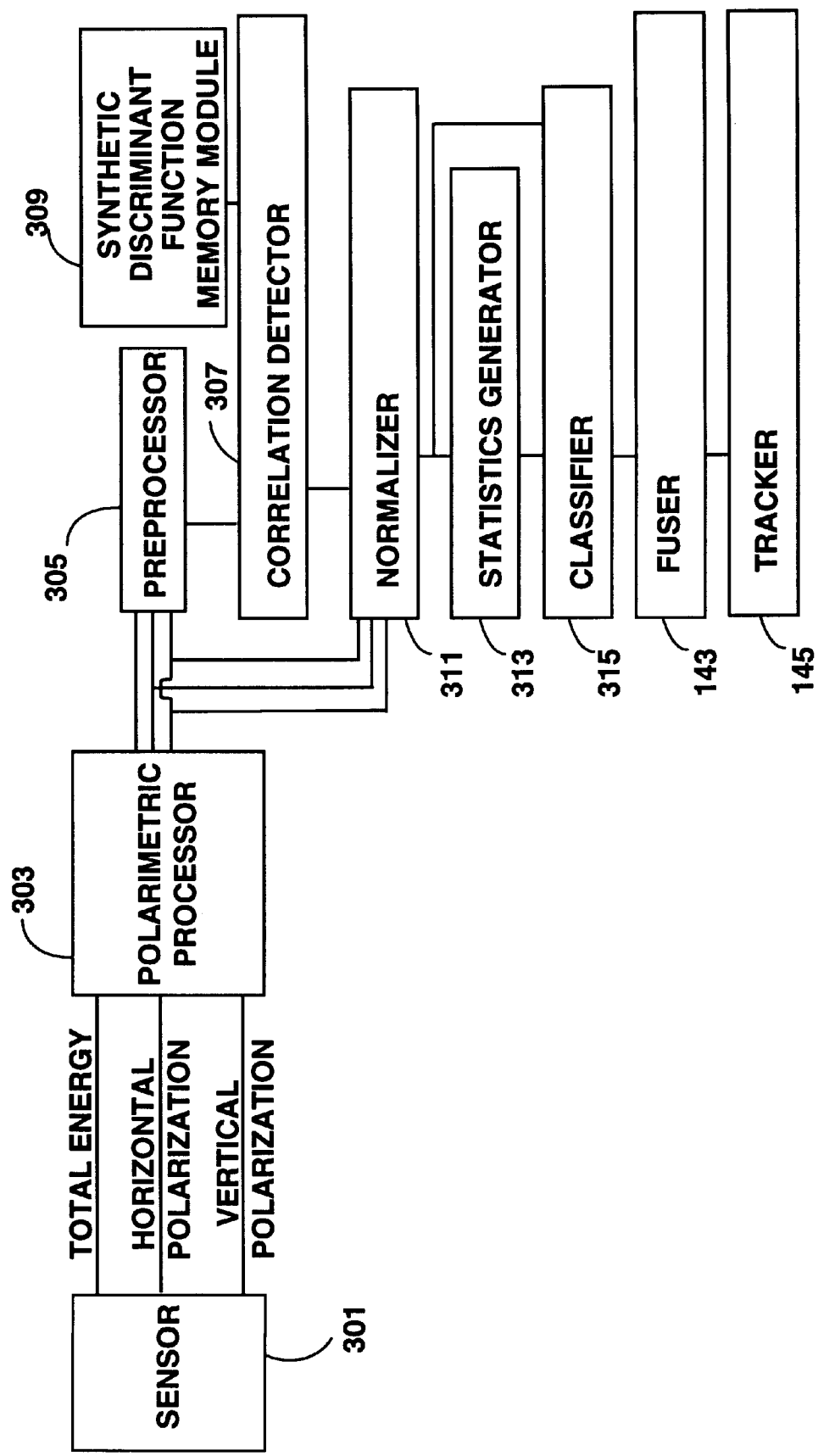
FIG. 3 illustrates addition of polarimetric capability to the synthetic discriminant function automatic target recognition system augmented by LADAR.

FIG. 3 shows the polarimetric capability that can be added to the synthetic discriminant function automatic target recognition system augmented by LADAR 100 as an additional processing channel. Polarimetric sensor 301 is capable of collecting complete polarized images at 0 degree, 45 degrees and 90 degrees from which the four Stokes parameters, $S_0$, $S_1$, $S_2$, and $S_3$ can be computed. From the Stokes parameters, several image types can be computed:

Degree of linear polarization=SqRt $(S_1^2+S_2^{\ 2})/S_0$;

Degree of circular polarization=$S_3/S_0$;

Degree of elliptical polarization=SqRt $(S_1^2+S_2^2+S_3^2)/S_0$.

The processing of the Stokes parameters and the degree of polarization images can be accomplished in polarimetric processor 303 as depicted in FIG. 3. It may also be accomplished as a part of the pre-processing done by pre-processor 305 which functions in the manner already described for the pre-processors of FIGS. 1 and 2. The fabrication of the reference polarimetric SDF filter can be based on the raw polarization data (0°, 45°, 90° or the total intensity of the returned beam) or on the degree of polarization images (linear, circular or elliptical). The remainder of the processing of the polarized image data for the ultimate use by tracker 145 occurs in a manner analogous to those described for FIGS. 1 and 2. Active and passive polarized images can be combined to make filters that have additional target discriminants.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An automatic target recognition system for locating and tracking a target, said system being resident in a seeker object and utilizing synthetic discriminant function to combine passive and active target imageries to produce an accurate target location and enable precise tracking thereof, said system comprising: a tracker for tracking a detected target; a plurality of image data sensors, said sensors being capable of sensing and collecting passive infrared, active LADAR range and active LADAR intensity digitized image data of a potential target and surrounding scenery; a plurality of pre-processors, said pre-processors being coupled to said sensors on one-to-one correspondence, each pre-processor receiving from said corresponding sensor the digitized image data and performing convolution on the image data to produce an image filter of the target; a plurality of correlators, said correlators being coupled to said pre-processors on one-to-one correspondence; a plurality of classifiers for classifying any target detected in the scenery; a plurality of synthetic discriminant function (SDF) memory modules, said SDF memory modules being coupled between said correlators and said classifiers on one-to-one correspondence, each SDF memory module holding therein a multiplicity of reference synthetic discriminant function filters that are descriptive of various targets likely to be found in the scenery, each reference SDF filter describing a target from a given perspective and a pre-selected reference SDF filter from each of said SDF memory modules being input to said corresponding correlator wherein said pre-selected reference SDF filter is correlated with the filter image of the live potential target to produce a correlation surface; a plurality of normalizers, said normalizers being coupled simultaneously to said sensors, said correlators and said classifiers on one-to-one correspondence, each normalizer receiving said correlation surface and digitized image data from said corresponding correlator and sensor, respectively, and normalizing said correlation surface and producing therefrom detection areas; a plurality of statistics generators being coupled between said normalizers and said classifiers on one-to-one correspondence, each of said statistics generators receiving said detection areas from said corresponding normalizer and computing the mean and standard deviation of said areas and inputing said mean and standard deviation to said corresponding classifier, said classifier, in response, correlating inputs from said statistics generator, said SDF memory module and said normalizer to produce a correlated target image; and a means for fusing, said fusing means being simultaneously coupled to said plurality of classifiers and to said tracker, said fusing means further being capable of receiving and fusing said correlated target image from each of said classifiers to determinine the target location and classification with greater reliability and thereby enable said tracker to track a classified target with greater accuracy.

2. An automatic target recognition system for locating and tracking a target as set forth in claim 1, wherein said pluralities of components comprise three each of said sensors, pre-processors, SDF memory modules, correlators, normalizers, statistics generators and classifiers.

3. An automatic target recognition system for locating and tracking a target as set forth in claim 2, wherein said first, second and third of each respective type component is adapted for processing infrared image, LADAR range and LADAR intensity digital data, respectively, of the potential target and its surrounding scenery.

4. An automatic target recognition system for detecting and tracking a target in a scenery, said system being resident in a seeker object and utilizing synthetic discriminant function to combine passive and active target imageries to determine accurate target location in the scenery and enable precise tracking of the target, said system comprising: a tracker for tracking a detected target; a first sensor for collecting infrared image data of the target; a first pre-processor coupled to said first sensor to receive therefrom said infrared image data and perform convolution on said infrared image data to produce an infrared image filter; a first correlator coupled to said first pre-processor to receive therefrom said infrared image filter; a first synthetic discriminant function (SDF) memory module, said first SDF memory module being coupled to said first correlator and containing a multiplicity of pre-formed infrared synthetic discriminant function filters that are descriptive of various targets likely to be found in the scenery, each pre-formed infrared SDF filter describing a target from a given perspective and scale, a pre-selected infrared SDF filter from said first SDF memory module being input to said first correlator wherein said pre-selected infrared SDF filter is correlated with said infrared image filter of the live potential target to produce a first correlation surface; a second sensor for collecting LADAR range data of the target; a second pre-processor coupled to said second sensor to receive therefrom said LADAR range data and perform convolution on said LADAR range data to produce a LADAR range data filter; a second correlator coupled to said second pre-processor to receive therefrom said LADAR range data filter; a second synthetic discriminant function (SDF) memory module, said second SDF memory module being coupled to said second correlator and holding a multiplicity of pre-formed LADAR range synthetic discriminant function filters that are descriptive of various targets likely to be found in the scenery, each pre-formed LADAR range SDF filter describing a target from a given perspective and scale, a pre-selected LADAR range SDF filter from said second SDF memory module being input to said second correlator wherein said pre-selected LADAR range SDF filter is correlated with said LADAR range filter of the live potential target to produce a second correlation surface; a third sensor for collecting LADAR intensity data of the target; a third pre-processor coupled to said third sensor to receive therefrom said LADAR intensity data and perform convolution on said LADAR intensity data to produce a LADAR intensity data filter; a third correlator coupled to said third pre-processor to receive therefrom said LADAR intensity data filter; a third synthetic discriminant function (SDF) memory module, said third SDF memory module being coupled to said third correlator and holding a multiplicity of pre-formed LADAR intensity synthetic discriminant function filters that are descriptive of various targets likely to be found in the scenery, each pre-formed LADAR intensity SDF filter describing a target from a given perspective and scale, a pre-selected LADAR intensity SDF filter from said third SDF memory module being input to said third correlator wherein said pre-selected LADAR intensity SDF filter is correlated with said LADAR intensity filter of the live potential target to produce a third correlation surface; a classifier coupled to said tracker, said classifier being capable of classifying any target detected in the scenery; a means for fusing, said fusing means being simultaneously coupled to said first, second and third correlators to receive therefrom said first, second and third correlation surfaces, respectively, and being adapted for fusing said correlation surfaces to produce a composite correlation surface; a normalizer, said normalizer being coupled simultaneously to said first sensor, second sensor, third sensor and said fusing means, said normalizer receiving said infrared image data from said first sensor, said LADAR range data from said second sensor, said LADAR intensity data from said third sensor and said composite correlation surface from said fusing means and normalizing said composite correlation surface to produce therefrom a detection area; a statistics generator coupled between said normalizer and said classifier, said generator receiving said detection area from said normalizer and computing the mean and standard deviation of said area and inputing said mean and standard deviation to said classifier, said classifier, in response, producing a correlated target image and determining the target location and classification, thereby enabling said tracker to track a classified target with greater accuracy.

5. An automatic target recognition system for detecting and tracking a target in a scenery as set forth in claim 4, wherein said system further comprises a fourth sensor, said fourth sensor being adapted for collecting polarized images of a target at 0°, 45° and 90°, a polarimetric processor coupled to receive said polarized image data from said fourth sensor and compute appropriate stokes parameters, a fourth pre-processor coupled to said polarimetric processor to receive therefrom said polarized image data and perform convolution on said polarized image data to produce a polarized image data filter; a fourth correlator coupled between said fourth pre-processor and said fusing means to receive from said fourth pre-processor said polarized image data filter; and a fourth synthetic discriminant function (SDF) memory module, said fourth SDF memory module being coupled to said fourth correlator and holding a multiplicity of pre-formed polarized image synthetic discriminant function filters that are descriptive of various targets likely to be found in the scenery, each pre-formed polarized image SDF filter describing a target from a given perspective and scale, a pre-selected polarized image SDF filter from said fourth SDF memory module being input to said fourth correlator wherein said pre-selected polarized image SDF filter is correlated with said polarized image filter of the live potential target to produce a fourth correlation surface.

* * * * *